United States Patent
Shintani et al.

(10) Patent No.: US 10,916,250 B2
(45) Date of Patent: Feb. 9, 2021

(54) DUPLICATE SPEECH TO TEXT DISPLAY FOR THE DEAF

(71) Applicant: Sony Corporation, Tokyo (JP)

(72) Inventors: Peter Shintani, San Diego, CA (US);
Brant Candelore, Escondido, CA (US);
Mahyar Nejat, San Diego, CA (US);
Robert Noel Blanchard, Escondido, CA (US)

(73) Assignee: Sony Corporation, Tokyo (JP)

( * ) Notice: Subject to any disclaimer, the term of this patent is extended or adjusted under 35 U.S.C. 154(b) by 329 days.

(21) Appl. No.: 15/995,927

(22) Filed: Jun. 1, 2018

(65) Prior Publication Data
US 2019/0371338 A1 Dec. 5, 2019

(51) Int. Cl.
*G10L 15/26* (2006.01)
*G10L 13/08* (2013.01)
*G06F 3/14* (2006.01)
*G09B 21/00* (2006.01)

(52) U.S. Cl.
CPC .......... *G10L 15/26* (2013.01); *G06F 3/14* (2013.01); *G09B 21/009* (2013.01); *G10L 13/08* (2013.01)

(58) Field of Classification Search
CPC ....... G10L 15/205; G10L 13/08; G10L 15/08; G10L 15/265; G06F 3/14; G09B 21/009; G09B 21/00; G09B 21/006; G09B 21/04; G09B 27/017
See application file for complete search history.

(56) References Cited

U.S. PATENT DOCUMENTS

| | | |
|---|---|---|
| 5,146,502 A | 9/1992 | Davis |
| 6,594,346 B2 | 7/2003 | Engelke |
| 6,795,807 B1 | 9/2004 | Baraff |
| 7,676,372 B1 | 3/2010 | Oba |
| 7,747,434 B2 | 6/2010 | Flanagan et al. |
| 2017/0243582 A1 | 8/2017 | Menezes et al. |

FOREIGN PATENT DOCUMENTS

CN 106686223 A 5/2017

OTHER PUBLICATIONS

"ORCAM", retrieved from https://www.orcam.com/en/.
(Continued)

*Primary Examiner* — Timothy A Musselman
(74) *Attorney, Agent, or Firm* — John L. Rogitz

(57) ABSTRACT

An application on a mobile phone or tablet computer or eyeglasses listens to the speech of a profoundly deaf person and interprets it in real time. The voice recognition can be trained to the voice of the profoundly deaf person. A display such as a small tablet display which can be hung around the speaker's neck can present text output by the voice recognition module to allow someone to read the text. The application can then detect speech from the listener and display text converted from the speech to the deaf person through glasses or to a cell phone that is being held by hand or to the tablet, or to a different tablet that the previous listener has hung around his or her neck. In case of the same tablet the text from the listener's speech can be shown upside down so that the deaf person can look down and read the text. Thus, the top of the tablet presents text from speech of the deaf person in the up position, and the bottom portion of the tablet presents text from speech of the listener upside down, to be read by the deaf person.

19 Claims, 4 Drawing Sheets

(56) References Cited

OTHER PUBLICATIONS

"Tap Systems—Wearable Keyboard, Mouse & Controller", Tap Systems, Retrieved from https://www.tapwithus.com/.
Aira, "Aira Service", retrieved from https://aira.io/.
ESight, "Glasses that Let the Visually Impaired See", Retrieved from https://www.esighteyewear.com/.
Jeffrey P. Bigham, Raja Kushalnagar, Ting-Hao Kenneth Huang, Juan Pablo Flores, Saiph Savage, "On How Deaf People Might Use Speech to Control Devices", ASSETS '17 Oct. 29-Nov. 1, 2017, Baltimore, MD, USA.
Thibault Duchemin, "Ava: Group Conversations Made Accessible", Indigegeo.
Peter Shintani, Brant Candelore, Mahyar Nejat, Robert Noel Blanchard, Hoda Sayyadinejad, "Speech Translation and Recognition for the Deaf", file history of related U.S. Appl. No. 15/995,735, filed Jun. 1, 2018.
Shintani et al., "Speech Translation and Recognition for the Deaf", related U.S. Appl. No. 15/995,735, Applicant's response to Non-Final Office Action filed Jul. 1, 2020.
Shintani et al., "Speech Translation and Recognition for the Deaf", related U.S. Appl. No. 15/995,735, Non-Final Office Action dated Jun. 26, 2020.

DUPLICATE SPEECH TO TEXT DISPLAY FOR THE DEAF

FIELD

The present application relates to technically inventive, non-routine solutions that are necessarily rooted in computer technology and that produce concrete technical improvements.

BACKGROUND

Severely hearing impaired and profoundly deaf people cannot hear themselves speak and so they are unable to approximate sounds typically found in "normal" speech. This poses problems for conversations since the listener has difficulty comprehending what is being said by the hearing-impaired speaker. The speech of the hearing impaired can be almost unintelligible even though the speaker is trying to properly articulate sound. Likewise, the normal-hearing conversational partner is difficult for the hearing-impaired person to understand.

Sign language offers a solution but unfortunately very few people understand it. Furthermore, sign language consists of a limited vocabulary that consequently can limit expression. Lip reading also offers a solution but is often inaccurate and moreover cannot be used when the speaker is not facing the deaf person.

SUMMARY

Present principles recognize the above problems and so provide an assembly with a housing. At least one processor is in the housing, and at least one display is supported on the housing and is configured to communicate with the processor. At least one computer storage also is in the housing and includes instructions executable by the processor to receive first speech from a first person. The instructions are executable to execute speech recognition on the first speech to render a first output and to present the first output as first text on a display. Furthermore, the instructions are executable to receive second speech from a second person and to execute speech recognition on the second speech to render a second output. The instructions can be executed to present the second output as second text on the display in an orientation opposite an orientation in which the first text is displayed.

In examples, the instructions are executable to present the first and second texts together on the display. In other examples, the instructions are executable to remove the first text from display when presenting the second text on the display. If desired, the first text can be presented with at least one first display characteristic different from the first display characteristic with which the second text is presented. In some implementations the first text is presented right side-up relative to a top of the display and the second text is presented upside-down relative to the top of the display.

In non-limiting embodiments, the instructions are executable to receive at least one correction to the first text to render corrected text and convert the corrected text to speech signals. The speech signals are then played on at least one speaker. The correction may be input by non-key entry taps on a surface. The housing can be, e.g., a mobile phone or tablet computer housing.

In another aspect, a system includes at least one computer storage that is not a transitory signal and that in turn includes instructions executable by at least one processor to receive first speech from a first person with a speech impediment. The instructions are executable to execute word recognition on the first speech to generate first output and to present the first output on at least one display as first text in a first rightness orientation. Furthermore, the instructions can be executed to receive second speech from a second person, execute word recognition on the second speech to generate second output, and present the second output on the at least one display as second text in a second rightness orientation.

In another aspect, a machine-implemented method includes receiving speech from a first person, receiving speech from a second person, and converting the speech from the first person to first text while converting the speech from the second person to second text. The method includes presenting the first and second texts on a display in different orientations from each other.

The details of the present disclosure, both as to its structure and operation, can be best understood in reference to the accompanying drawings, in which like reference numerals refer to like parts, and in which:

DETAILED DESCRIPTION

Figure 1:
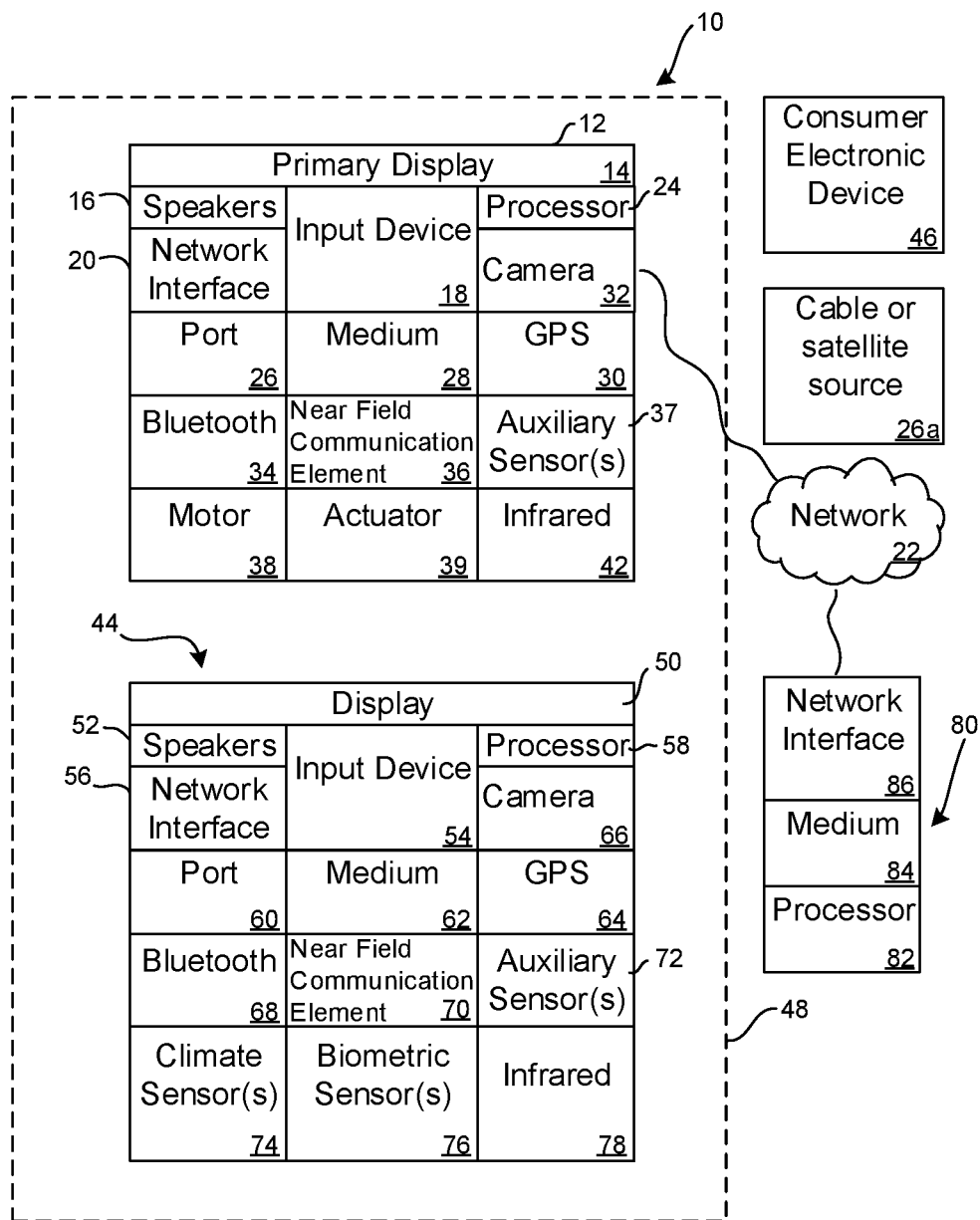
FIG. 1 is a block diagram of an example system including an example in consistent with present principles.

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or tablet computer or notebook computer, and accordingly may have one or more of the components described below. The first CE device 44 alternatively may be embodied in the form of eyeglasses or a wireless telephone. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
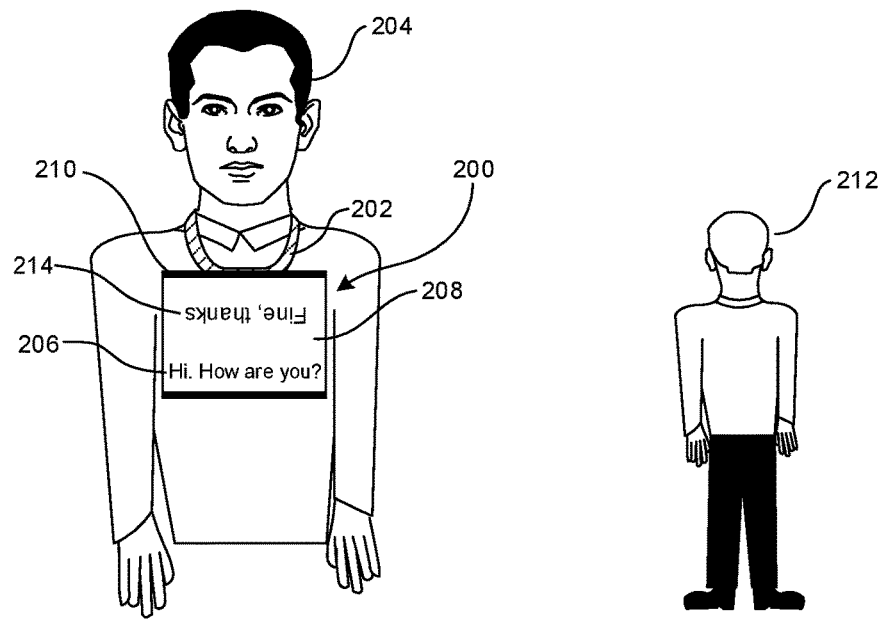
FIG. 2 is a schematic view of a hearing-impaired person with a tablet computer with display on which text spoken by the hearing-person person is presented upside right to be read by a listener, and responses by the listener are presented upside-down, to be read by the hearing-impaired person.

FIG. 2 shows an example embodiment of a speech-to-text viewing device 200. The device 200 may incorporate appropriate components shown and described above in reference to FIG. 1, e.g., some or all of the components of the CE device 44. The device 200 may be implemented by a tablet computer or mobile phone or other appropriate device.

The device 200 may include a lanyard 202 that can be worn around the neck or other body part of a person 204 such as a hearing-impaired person. When the wearer 204 speaks, the speech (in the example shown, "hello, how are you?") is detected by a microphone that may be implemented by the device 200, converted to text by a processor in the device 200 implementing a speech recognition module that may be trained in accordance with the logic of FIG. 4 discussed below to recognize the speech of the hearing-impaired wearer 204, and the resulting text 206 presented right side-up on a display 208 relative to a top 210 of the display 208 as shown. In this way, the text 206 can be read by a listener 212 of the hearing-impaired person 204.

Should the listener 212 respond, the listener's speech (in the example shown, "fine, thanks") can be detected by the microphone and converted to text by the processor of the device 200 and presented as text 214 on the display 208. As shown, to facilitate reading of the listener-generated text 214 by the hearing-impaired person 204, the text 214 representing the speech of the listener 212 can be presented upside-down on the display 208 relative to the top 210, which is closest to the eyes of the hearing-impaired person 204. More generally, the text from speech of one person is presented on the display in the opposite orientation of text from speech of another person.

Figure 3:
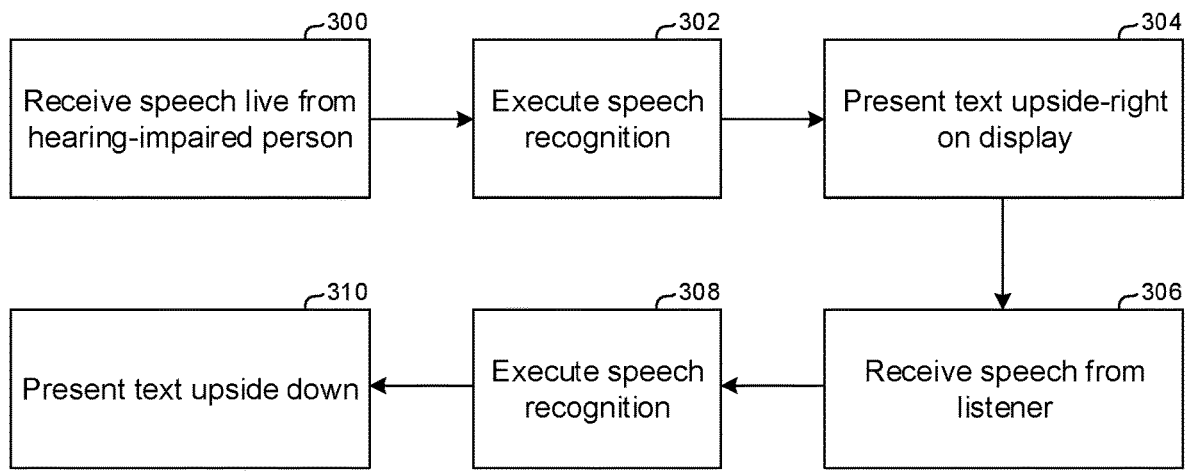
FIG. 3 is a flow chart of example logic consistent with FIG. 2.

FIG. 3 provides further details. Commencing at block 300, speech is received from the hearing-impaired person 204 via, e.g., one or more microphones on the device 200 and input to one or more processors in the device 200 executing instructions contained on one or more computer storages in the device 200. The speech is converted to text at block 302 in near-real time (with a short delay for processing time) by the processor executing a speech-to-text conversion module, and the text is presented at block 304 upside-down on the display 208.

In determining that the speaker is correlated to the one whose speech is to be presented upside-down, the processor may execute voice recognition on the received speech and compare it to one or more voice templates to ascertain the identity of the speaker. Or, the processor may simply assume that the speech with the highest volume is that of the hearing-impaired person 204, who typically will be closer to the microphone of the device 200 than the listener 212.

Proceeding to block 306, the device may pick up speech from another person such as the listener 212 and execute text-to-speech conversion on it at block 308. The resultant text 214 is presented on the device 200 preferably upside-down to facilitate being read by the hearing-impaired person 204. Note that the size and/or font and/or color and/or other display attribute of the text 214 from the listener 212 may be different (e.g., larger) than the corresponding display characteristic of the text 206 from the hearing-impaired person 204. The texts 206, 214 may be presently together as shown or they may be presented alone, with first text 206 being removed from display upon detection or rendering of second speech from the listener 212.

Figure 4:
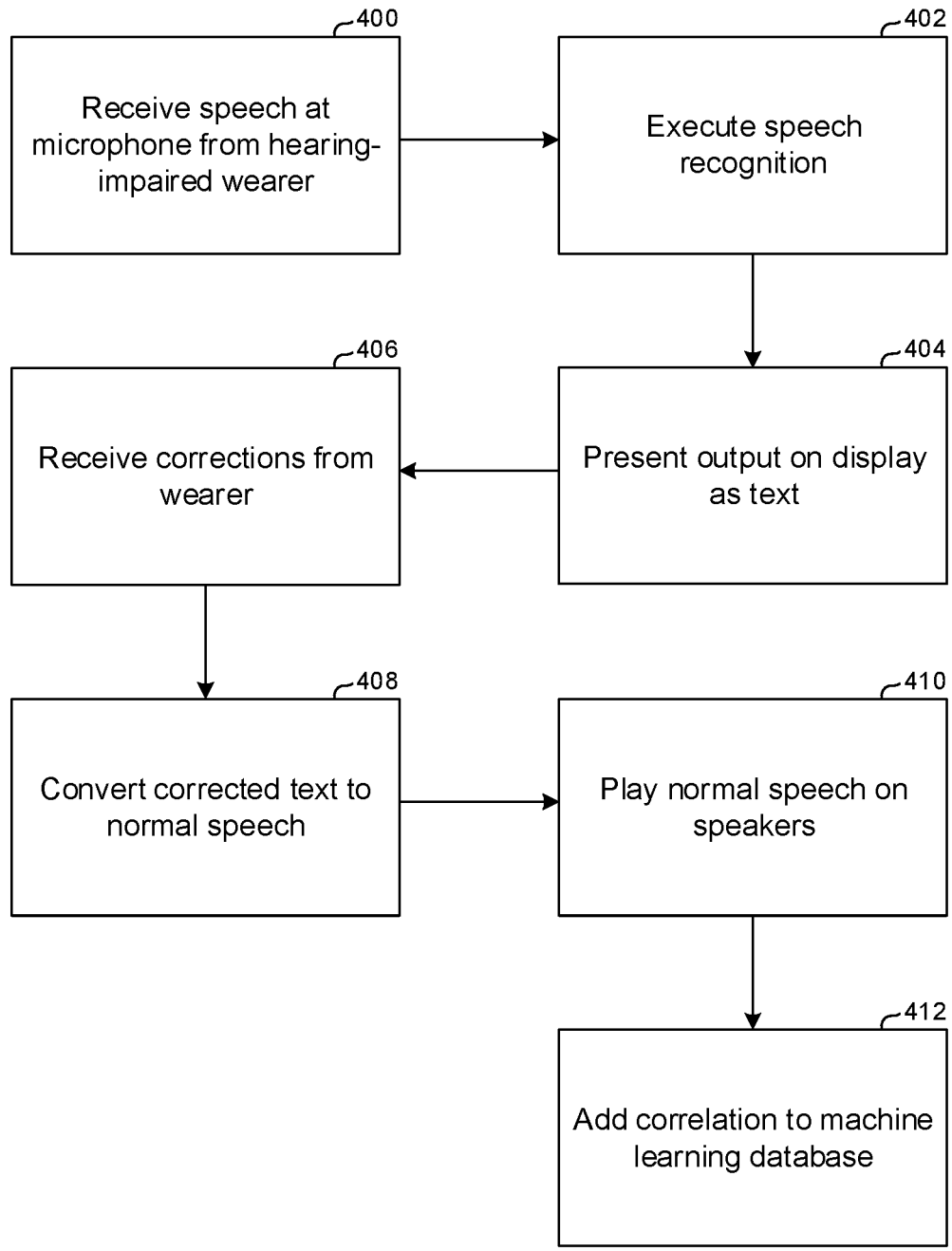
FIG. 4 is a flow chart of example logic for training a speech recognition engine to recognize speech of a hearing-impaired person consistent with present principles.

FIG. 4 illustrates additional example logic consistent with present principles. Commencing at block 400, speech is received from a hearing-impaired speaker. The speaker may be profoundly deaf and thus may have a speech impediment that makes the speaker difficult to understand. The speech nay be received, e.g., at a small microphone on the device 200 shown in FIG. 2 implementing components of, e.g., the CE device 44 of FIG. 1.

Moving to block 402, speech recognition is executed on the speech received at block 400. This renders an output that can be presented as text on a display such as any of the displays divulged herein, including the device 200.

If the speech impediment of the speaker is sufficiently bad, it may be difficult for the word recognition engine executed by, e.g., the processor in the device 200 to correctly output the text of the word(s) intended by the speaker. Accordingly, the text output at block 404 may contain errors. With this in mind, corrections to the text may be received at block 406. The corrections may be received by means of the hearing-impaired speaker inputting corrections using a key entry device, or by speech recognition input from the speaker who may attempt to better articulate misspelled words in the presented text, or by a technique of taps by the (hearing-impaired) speaker on, e.g., the device 200 which, recall, may include on or more motion sensors that can sense taps, for example, taps on the device 200.

In an example, suppose three words output from block 402 are presented on the display at block 404. A single tap may indicate the first word, a double tap the second, and a triple tap the third. Multiple taps may be identified by having been received within a usually short time period of each other, e.g., within one-half second of each other.

In this way, the word desired to be corrected may be identified, and a screen cursor located over the first letter of the corresponding word on the display. Then, should the correcting person desire to change that letter, he may either tap a code such as Morse code representing the desired letter, or some other code such as, in quick succession, the number of taps corresponding to the numeric location in the alphabet of the correct (replacement) letter. Once this input has been received, by waiting for a timeout period, e.g., two to three seconds, the screen cursor may move to the second letter in the word to permit correction of that letter as well, and so on through the word. Tap patterns may be correlated to insertion and deletion commands to permit inserting a letter or deleting a letter from the display text.

Once corrections to the displayed text have been completed, the logic may move to block 408 to convert the corrected text to speech signals. Moving to block 410, the speech signals are then played in "normal" language on speakers. In an example, the speakers may be on the device 200 or a computing device such as a mobile phone communicating therewith via. e.g., Bluetooth. At block 412, the initial distorted speech received at block 400 is correlated to the corrected speech from block 406 in a data structure that may be accessed by a machine learning algorithm, so that subsequent utterances by the speaker of the same sounds will automatically be correlated to the "corrected" words.

In this way, a hearing-impaired person can train his or her device, whether implemented as eyeglasses or another device such as a mobile phone or tablet computer, to learn the speech of the person and how to translate it into "normal" speech in the same language. Thus, speech interpretation can be implemented of what the hearing-impaired person says and repeated live in "normal" language in pseudo-real time as the hearing-impaired person talks. The person's utterances are interpreted as described and displayed as text to the deaf speaker and then re-spoken in "normal" language to others.

Accordingly, a severely hearing-impaired person can train a speech recognition engine for his particular voice using as many words as possible. This could be treated as a type of language requiring translation or heavily accented English in which the spoken phrase is shown on a display, e.g., on the device 200 so that the deaf person can verify the phrase if need be and make edits to it using voice commands or a portable keyboard or taps. If the text presented is acceptable, then the text is converted to a spoken phrase that is played in normal accents. Alternatively, instead of speaking a hearing-impaired person can type text and have it spoken out loud on the speakers.

Figure 5:
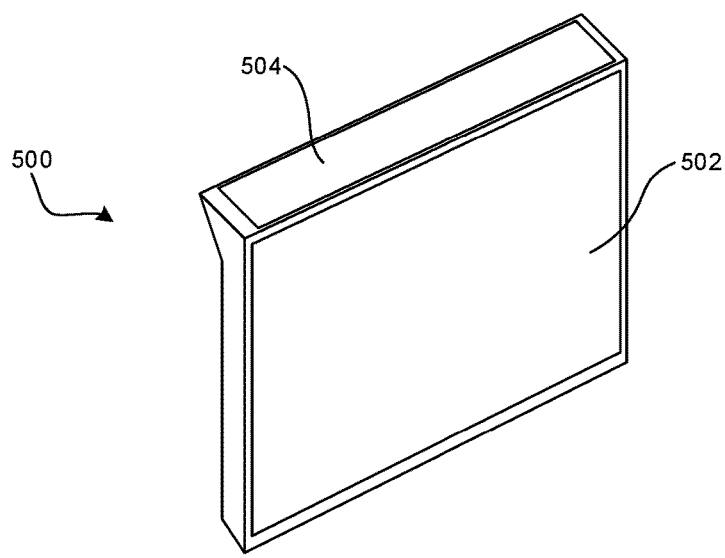
FIG. 5 illustrates an alternate embodiment that uses two opposed displays on a single device.

FIG. 5 illustrates a device 500 such as a mobile phone which has a primary display 502 and opposite the primary display 502, a secondary display 504, which may be of lower resolution than the primary display 502. In any case, the device 500 may be held by a hearing-impaired person with the primary display 502 facing away from the hearing-impaired person toward a conversation partner, with speech from the hearing-impaired person being converted to text and presented on the primary display and speech from the conversation partner being converted to text and presented on the secondary display 504, which faces the hearing-impaired person. In both cases the text is presented right side-up.

Figure 6:
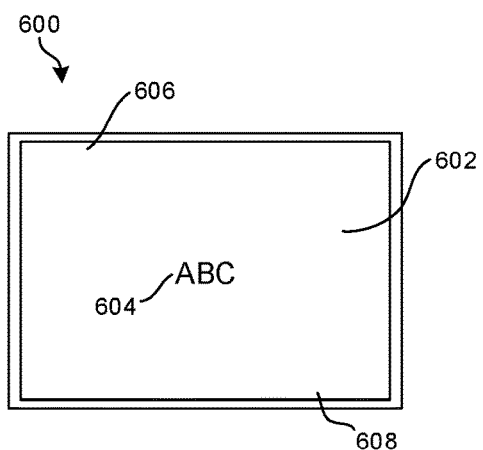
FIGS. 6 and 7 illustrate another alternate embodiment in which a single display device is flipped between two orientations to face which person in a conversation is the listener.
Figure 7:
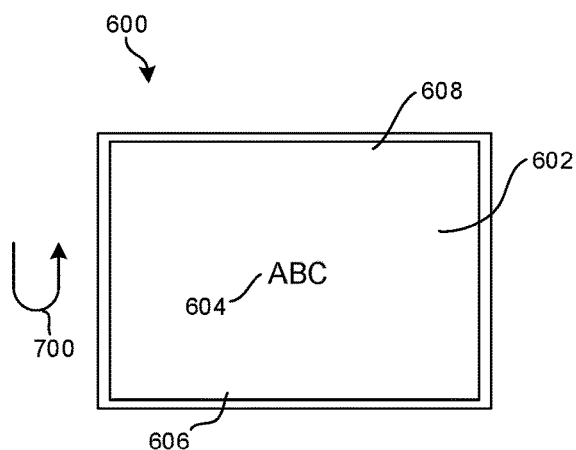

FIGS. 6 and 7 illustrate yet another embodiment in which a device 600 such as any of those described herein includes a display 602 on which text 604 that has been converted from speech is presented right side-up relative to a top portion 606 of the display 602 and bottom 608 of the display. In such an orientation, received speech is presented as shown based on one or more motion or orientation sensors in the device 600 such as any of the sensors shown and described in reference to FIG. 1 indicating the "right side up" orientation depicted. It will readily be appreciated that the device 600 may be held in the orientation shown with the display 602 facing a conversation partner of a hearing-impaired person and presenting text converted from speech from the hearing-impaired person.

As indicated by the arrow 700, when the hearing-impaired speaker has completed talking and the text 604 thereof presented to the conversation partner, the device 600 may be flipped such that the bottom 608 of the display 600 is above the top 606. This flipping may occur by, e.g., the hearing-impaired person to be able to flip the display 602 toward him and read text converted from speech from the conversation partner, with the text being presented upside-down relative to the top 606 of the display 600 but right side-up as viewed by the hearing-impaired person responsive to the motion or orientation sensor indicating the motion represented by the arrow 700. In this embodiment only, the text from speech of one person at a time need be displayed.

While particular techniques are herein shown and described in detail, it is to be understood that the subject matter which is encompassed by the present application is limited only by the claims.

What is claimed is:

1. An assembly, comprising:
a housing;
at least one processor in the housing;
at least one display supported on the housing and configured to communicate with the processor;
the processor being configured with instructions executable by the processor to:
receive first speech from a first person;
execute speech recognition on the first speech to render a first output;
present the first output as first text on a display;
receive second speech from a second person;
execute speech recognition on the second speech to render a second output;
present the second output as second text on the display in an orientation opposite an orientation it which the first text is displayed such that text from speech of the first person is presented on the display in the opposite orientation of text from speech of the second person.

2. The assembly of claim 1, wherein the instructions are executable to present the first and second texts together on the display.

3. The assembly of claim 1, wherein the instructions are executable to remove the first text from display when presenting the second text on the display.

4. The assembly of claim 1, wherein the first text is presented with at least one first display characteristic different from the first display characteristic with which the second text is presented.

5. The assembly of claim 1, wherein the first text is presented right side-up relative to a top of the display and the second text is presented upside-down relative to the top of the display.

6. The assembly of claim 1, wherein the instructions are executable to:
receive at least one correction to the first text to render corrected text;
convert the corrected text to speech signals;
play the speech signals on at least one speaker.

7. The assembly of claim 6, wherein the correction is input by non-key entry taps on a surface.

8. The assembly of claim 1, wherein the housing is a mobile phone or tablet computer housing.

9. A system comprising:
at least one computer storage that is not a transitory signal and that comprises instructions executable by at least one processor to:
receive first speech from a first person with a speech impediment;
execute word recognition on the first speech to generate first output;
present the first output on at least one display as first text in a first rightness orientation at least in part based on at least one signal from a motion sensor;
receive second speech from a second person;
execute word recognition on the second speech to generate second output; and
present the second output on the at least one display as second text in a second rightness orientation.

10. The system of claim 9, wherein the instructions are executable to:
receive input from the person with a speech impediment to change the first text;
change the first text according to the input to render modified text;
convert the modified text to sound signals; and play the sound signals on at least one speaker.

11. The system of claim 9, comprising the at least one processor.

12. The system of claim 11, comprising the at least one display.

13. The system of claim 10, wherein the input comprises taps sensed by at least one motion sensor.

14. The system of claim 9, wherein the instructions are executable to present the first and second texts together on the display.

15. The system of claim 9, wherein the instructions are executable to remove the first text from display when presenting the second text on the display.

16. The system of claim 9, wherein the first text is presented with at least one first display characteristic different from the first display characteristic with which the second text is presented.

17. The system of claim 9, wherein the first text is presented right side-up relative to a top of the display and the second text is presented upside-down relative to the top of the display.

18. A machine-implemented method comprising:
receiving speech from a first person;
receiving speech from a second person;
converting the speech from the first person to first text;
converting the speech from the second person to second text; and
presenting the first and second texts on a display in different orientations from each other, the orientations being determined at least in part based on voice recognition executed on the speech.

19. The method of claim 18, comprising presenting the first text upside-down on the display.

* * * * *